United States Patent [19]
Olshansky et al.

[11] 3,829,651
[45] Aug. 13, 1974

[54] METHOD OF ELECTRON-BEAM WELDING OF THICK PARTS BY VERTICAL AND GIRTH SEAMS

[76] Inventors: Nikolai Alexandrovich Olshansky, ulitsa Malomoskorskaza 5, k.v. 76; Matvei Yakovlevich Smelyansky, ulitsa Uralskaya, 6, korpus 5 k.v. 107, both of Moscow; Anatoly Petrovich Lopatko, Moskovskoi olasti, ulitsa, Malakhovka Moskovskoi oblasti; Leonid Grigorievich Tkachev, ulitsa Krasny Kazanets, 19 korpus 1, Moscow; Arkady Filippovich Kozhaev, ulitsa Mikhailova, 23, k.v. 3, Moscow; Alexandr Ivanovich Sapozhnikov, ulitsa Mosfilmovskaya, 17/25, Moscow; Gennady Anatolievich Chernakov, Poselok Selyatino Moskovskoi oblasti, Dom 18, k.v. 30, Moskovskoi oblasti, all of U.S.S.R.

[22] Filed: Jan. 13, 1972

[21] Appl. No.: 217,590

[52] U.S. Cl............................ 219/121 EM, 219/126
[51] Int. Cl............................................. B23k 15/00
[58] Field of Search... 219/121 EB, 121 EM, 121 R, 219/126, 125, 13 F

[56] References Cited
UNITED STATES PATENTS

| | | | |
|---|---|---|---|
| 2,997,571 | 8/1961 | Smout | 219/126 |
| 3,251,526 | 5/1966 | Agnew et al. | 219/126 X |
| 3,440,392 | 4/1969 | Erlandson et al. | 219/121 EB X |
| 3,466,487 | 9/1969 | Davis et al. | 219/121 EB X |
| 3,518,397 | 6/1970 | Hannahs | 219/126 X |
| 3,582,608 | 6/1971 | Ito et al. | 219/137 |
| 3,592,995 | 7/1971 | Hinrichs | 219/121 EB |
| 3,605,247 | 9/1971 | Bingle et al. | 219/121 EM X |

*Primary Examiner*—E. A. Goldberg
*Assistant Examiner*—G. R. Peterson
*Attorney, Agent, or Firm*—Eric H. Waters

[57] ABSTRACT

Parts to be welded are interconnected rigidly by a vertical butt joint. An electron beam is directed horizontally and the parts and the electron beam are moved relative to each other. The distance between the surface of the molten metal and the axis of the electron beam, maintained in the course of the welding is from approximately 2 to 2.5 diameters of the electron beam. Welding proceeds at a low accelerating voltage and special seam formers keep liquid metal from flowing out. The seam formers of the device are made as cooled plates with grooves. They are placed at opposite sides of the parts, with the grooves directed along the seam. One of the seam formers has a hole for the passage of the electron beam.

4 Claims, 5 Drawing Figures

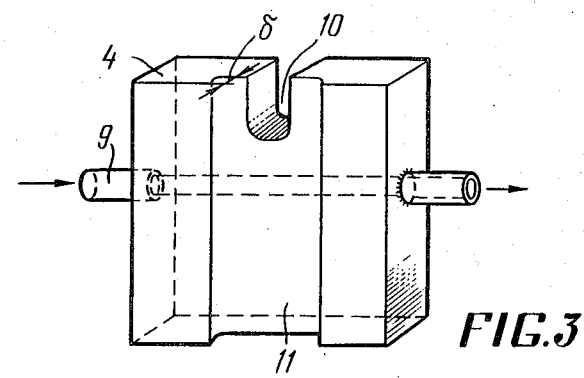
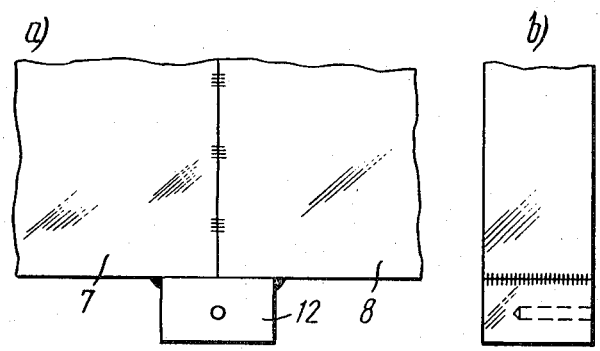
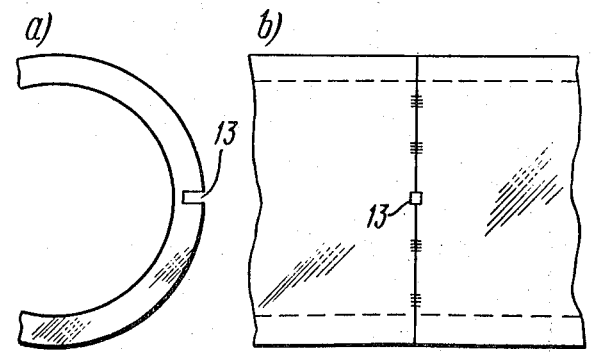

METHOD OF ELECTRON-BEAM WELDING OF THICK PARTS BY VERTICAL AND GIRTH SEAMS

The present invention relates to an improvement in welding methods and more particularly it relates to an improvement in the method of electron-beam welding of thick parts by vertical and girth seams and can be utilized in the joining of metal parts, particularly steel parts, and of parts made of other materials.

In the description that follows the term "low accelerating voltage" will be understood as a voltage below 60 kV while "high accelerating voltage" will refer to voltages above 100 kV, and the "thick parts" will be understood as parts at least 100 mm thick.

It is known in the art that the energy of the electron beam required for full penetration is proportional to the thickness of the parts to be welded. Therefore, an increase in the thickness of the parts to be welded inevitably calls for raising the accelerating voltage. Thus, if the accelerating voltage for the electron-beam welding of 50 mm steel plates is 50–60 kV, it must be increased to 150 kV for welding 100 mm plates.

The use of electron beams with a high accelerating voltage (in excess of 100 kV) entails a number of disadvantages. One of them consists in more stringent requirements for the accuracy of assembling the parts to be welded and the surface finish of their edges since the diameter of the electron beam is extremely small so that the clearances in the joint should not be over 0.1 mm.

Another disadvantage lies in more exacting requirements for the accuracy of aligning the electron beam with the joint and for the follow-up systems. Besides, the quality of welds proves to be very low due to incomplete fusion and porosity. Incomplete fusion occurs when the electron beam deviates from the joint axis while pores appear because it is difficult for the gas bubbles to escape to the surface of the molten pool through a narrow and long fused channel.

Finally, the efficiency of the high-voltage electron gun is lower than that of the low-voltage gun owing to frequent high-voltage breakdowns.

In view of these disadvantages the maximum thickness of steel plates which can usually be welded reaches not more than 100 mm. As a rule, electron beam welding is used for joining parts in a lower position, using a vertical electron beam and moving the beam and the parts relatively to each other.

Known in the art the attempts to carry out electron-beam welding of vertical or grith seams girth a horizontal electron beam.

However, up to the present time this could be attained only in welding comparatively thin parts or parts made of low-melting metals. These limitations are attributable to the fact that molten metal easily flows out of the molten pool located on a vertical surface.

Besides, a limited penetrating power of the electron beam in all the known methods of electron-beam welding is attributable to the fact that the beam of electrons in the molten channel is screened in the process of welding by the molten metal, vapors and gases. In order to provide a stable molten channel throughout the thickness of the welded parts, it is necessary to raise the accelerating voltage which, in turn, results in a reduction of the beam diameter and a higher energy density in the electron beam.

Besides, the shape of the seam in all the existing methods of electron-beam welding is uncontrollable. The "dagger" seam with a 40:1 ratio of seam height to its width, obtained by electron-beam welding with a high accelerating voltage, is hard to align with the joint due to small dimensions of the seam, particularly in its root portion, which may impair the quality of the weld.

An object of the present invention resides in providing a method of welding thick parts by a vertical or girth seam with a horizontal electron beam at a low accelerating voltage and a high quality of the seam, and providing a device for the realization of said method.

The main object of the invention is to provide such conditions for electron beam welding which rule out screening of the beam in the molten channel by liquid metal and vapors.

This and other objects are achieved by providing a method of welding by a vertical seam with a horizontal electron beam and with relative motion of said beam and part wherein, according to the invention, the distance between the level of the molten metal and the axis of the electron beam inside the parts being maintained in the course of welding from approximately 2 to 2.5 diameters of the electron beam, and wherein the liquid metal is kept from flowing out of the welding zone.

The advantages of the method according to the present invention reside in that, due to a clearance between the upper surface of the molten metal and the electron beam, the molten metal drips by gravity into the lower part of the channel so that the zone of interaction of the electron beam with the solid body is free of liquid metal. This eliminates screening of the electron beam by liquid metal and provides for the effect of deep penetration, from 150 to 300 mm and over.

The vertically extending channel is better suited for the evacuation of vapors and gases. The molten metal drifting in the form of drops towards the crystallizing zone can be fully degassed which renders the method according to the invention independent of the content of the gases in the metal. Forced forming makes it possible to obtain the required shape of the seam and its reinforcing convexity.

It is practicable that the channel should be made before welding at the beginning of the seam, said channel extending along the joint of the parts perpendicular to the welded seam and having a cross-section of 2–2.5 electron beam diameters and a length equal to 0.7–0.8 of the part thickness. This ensures the required clearance between the electron beam and the surface of the molten metal right at the beginning of the welding and helps in rapidly reaching rated welding conditions.

For higher quality of the seam, the diameter of the electron beam in the channel should range from 0.02 to 0.04 of the part thickness with the energy density in the electron beam being about $10^5$ V/cm$^2$ and an accelerating voltage from 30 to 60 kV approximately. Under such welding conditions the electron beam produces a penetration channel with a depth-to-width radio of 10:1. Correspondingly, the weld shape factor is also 10:1.

This means that the seam width in the root section will be sufficiently large. Such seams are easily aligned with the joint and little sensitive to the clearances up to 0.8 mm. For example, the width of the seam in the root section of a 120 mm steel plate is 4–5 mm.

The device for the realization of the method according to the present invention, comprising an electron gun and a mechanism for relative motion of the electron beam and the welded parts, has according to the invention two seam formers in the form of cooled slides for keeping the metal from flowing out, said slides being installed along the seam on the sides of the joint and provided with grooves which are positioned in the course of welding along the seam, one of the formers being provided with a through hole for the passage of the electron beam.

The depth of the groove in the seam former installed at the side of the electron gun is 0.05 of the thickness of the parts being welded while the width of the groove is somewhat larger than the beam diameter.

Now the invention will be described in detail by way of example with reference to the accompanying drawings, in which:

FIG. 3 illustrates a forming device;

FIG. 4a and b show the parts assembled for straight-seam welding;

FIG. 5a and b show the parts assembled for the girth-seam welding, in front and side views, respectively.

Let us consider an arrangement for electron-beam welding of thick steel plates when the parts are moved in the course of welding and the electron beam is stationary.

Figure 1:
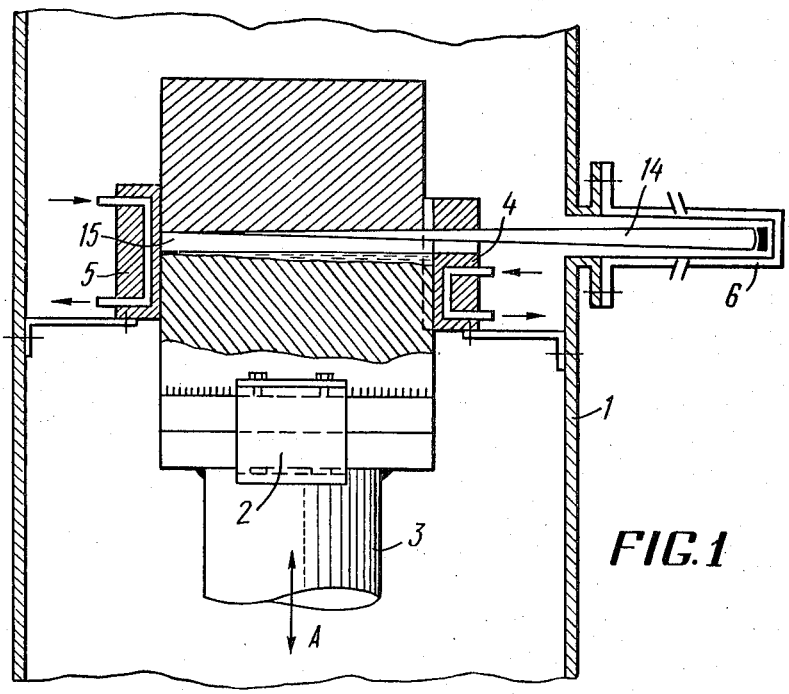
FIG. 1 is a schematic diagram of the welding plant for the realization of the method according to the invention with the seam formers and parts to be welded shown in section.
Figure 2:
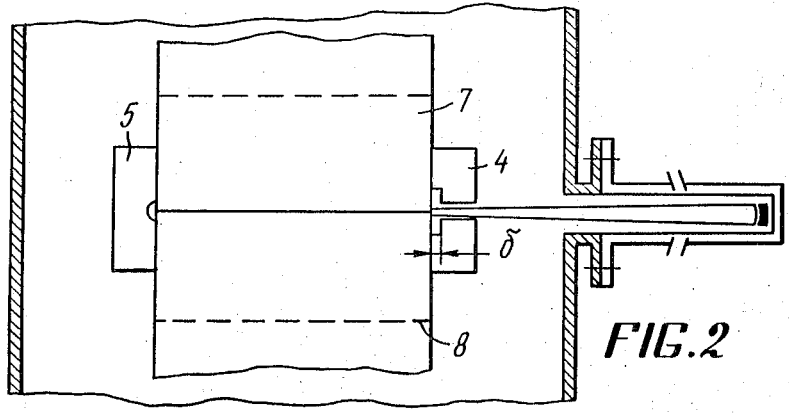
FIG. 2 is a top view of the parts assembled for welding in the welding plant according to FIG. 1.

A vacuum chamber 1 (FIG. 1) accommodates a mechanism 2 for fastening the parts to be welded, a mechanism 3 for moving the parts vertically as shown by arrow A, and devices 4 and 5 for forced forming of the seam, referred to hereinafter as seam former for brevity. Fastened outside to the chamber is a horizontally positioned electron gun 6. The system for degassing the chamber and the gun is made separately. As can be seen from FIG. 2, parts 7 and 8 to be welded are fastened so as to locate the seam formers 4 and 5 on both sides of the joint.

The seam former 4 for forced forming of the portion of the seam located at the side of the electron gun is shown separately in FIG. 3 and is made as a plate from a metal with a high heat-conducting ability, e.g., copper, with a channel 9 for the circulation of the cooling liquid. This seam former has an open through hole 10 for the passage of the beam and a vertical groove 11 extending through the entire height for forming the top of the seam. The width of the groove is somewhat larger than the beam diameter and its depth $\delta = 0.05$ of the part thickness.

It is intended that all surplus metal which is apt to be produced during electron-beam welding in the form of a reinforcing bead must fit accurately into this groove. Thus, to obtain better results in the welding of steel plates 120 mm thick, the width of the groove must be equal to the beam diameter plus 4 mm and its depth should be from 5 to 6 mm.

The seam former installed at the other side of the joint is similar to the one described above with the sole difference that it has no through hole and that the width of the groove for welding the plates of the above-stated thickness is 5–6 mm and its depth is 2–3 mm.

The process of electron-beam welding according to the method disclosed in the present description is carried out as follows. The parts 7 and 8 to be welded (FIG. 4a) are assembled without a clearance and fastened rigidly to each other. The lower face of the parts is fitted with a rigidly fixed plate 12 on which welding is started. At the point where welding begins, a hole must be made in said plate 12, for example by drilling, to a depth which is 0.7–0.8 of the part thickness. The hole diameter should be equal to 2–2.5 beam diameters. In the case of girth seams, such a starting hole 13 of the above-specified dimensions is made directly in the parts as shown in FIGS. 5a and b.

The parts assembled for straight-seam welding (FIG. 1) are secured so as to position the joint vertically. Then the seam formers 4 and 5 are pressed tightly against the parts 7 and 8 and the seam former 4 is set so as to align the hole 10 with the axis of the electron beam 14. The seam former 5 is installed on the other side of the joint.

The parts 7 and 8 assembled for welding are moved by the mechanism 3 to a position in which the inlet hole in the plate 12 is lined up accurately with the hole 10 in the front seam former 4. Below the hole 10, the groove in the seam former 4 is sealed with a stopper of asbestos or some other heat-resistant material.

An electron gun with a Pearce's optical system rated, approximately, 50 kW, with an accelerating voltage up to 60 kV, generates an electron beam with a diameter of 4 mm (for thicknesses of 100–120 mm). This can ensure an energy density in the beam of about $5.10^5$ W/cm². The tungsten cathode of such a gun may be 6–8 mm in diameter. At a small current an optimum focusing of the beam is carried out on the part after which the beam is accurately aligned with the hole in the parts by means of a deflecting system.

Welding begins by starting the downward travel of the parts and increasing the beam current to the rated value. The approximate welding conditions for low-carbon steel parts 120 mm thick are as follows: $V =$ 'kV, $I = 1$ A, welding rate 10 m/hr.

When the edges of the moving parts are melted by a powerful electron beam, the liquid metal drops along the walls of the channel 15 into its lower part where it is crystallized. The seam formers 4 and 5 keep the liquid metal from flowing out. With the properly selected dimensions of the groove in the seam former 4 a vertically extending oval channel will exist under the beam throughout the entire period of welding, the distance between the beam axis and the upper surface of the liquid metal being constant, equalling 2–2.5 diameters of the electron beam.

In the process of welding, the vapors and gases of the molten metal have a better escape through the vertically extending channel 15 which improves substantially the quality of the seam.

When use is made of a filler wire inserted into the channel 15 with the purpose of, say, alloying the seam metal, there appears a certain amount of surplus metal which by all means has to be placed into the groove 11 (FIG. 3). In this case the groove depth should be greater than 0.05 of the part thickness.

The welded seam is made by the pool method accompanied by the forced forming of the seam surfaces by the cooled seam formers 4 and 5. An open hole in the seam former 4 provides for watching the level of the pool and of the behavior of the liquid metal in it. In case of straight seams, welding is completed on the end plate (not shown in the drawing) by cutting out the power supply. In the case of girth seams, first the starting point of the seam is overlapped and then the welding current is gradually brought down to zero in order to weld up the crater.

The method according to the present invention provides for complete penetration of metal plates 150 mm thick and thicker, makes it possible to use low-voltage electon-beam equipment, to improve the quality of the welded seams, and to produce a seam with any shape of reinforcement, the latter depending on the shape of the seam former grooves.

What is claimed is:

1. A method electron-beam welding of thick parts by a vertical or girth seam, so as to rigidly butt-joining the parts to each other, at a low accelerating voltage and high quality of the seam, comprising the steps of disposing the parts in a vacuum chamber, directing an electron beam horizontally against the parts, producing relative movement between the parts and the electron beam, performing butt-welding operation in a welding zone, maintaining a distance in the course of the welding, between the surface of the molten metal and the axis of the electron beam, which ranges from about 2 to 2.5 electron beam diameters, proceeding with the welding operation at a low accelerating voltage of the electron beam, and finally preventing the molten metal from flowing out from the welding zone.

2. The welding method as defined in claim 1, further comprising the step, preceding the butt-welding operation, of making a channel at the starting point of the weld, the channel being perpendicular to the welded seam and having a cross-sectional size equalling 2 to 2.5 diameters of the electron beam.

3. The welding method as defined in claim 2, wherein the length of the starting channel is from 0.7 to 0.8 of the part thickness.

4. The welding method as defined in claim 2 wherein the diameter of the electron beam in the starting channel is 0.02 to 0.04 of the part thickness, with an energy density in the beam of about $10^5$ W/cm$^2$ and an accelerating voltage approximately from 30 to 60 kV.

* * * * *